(12) United States Patent
Wang et al.

(10) Patent No.: US 8,059,743 B2
(45) Date of Patent: Nov. 15, 2011

(54) METHOD FOR TRANSMITTING SIGNALS IN A WIRELESS COMMUNICATION SYSTEM AND COMMUNICATION SYSTEM

(75) Inventors: Zhaocheng Wang, Stuttgart (DE); Masahiro Uno, Fellbach (DE)

(73) Assignee: Sony Deutschland GmbH, Berlin (DE)

( * ) Notice: Subject to any disclaimer, the term of this patent is extended or adjusted under 35 U.S.C. 154(b) by 849 days.

(21) Appl. No.: 11/951,618

(22) Filed: Dec. 6, 2007

(65) Prior Publication Data

US 2008/0187067 A1 Aug. 7, 2008

(30) Foreign Application Priority Data

Feb. 7, 2007 (EP) ..................................... 07101913

(51) Int. Cl.
*H04B 7/02* (2006.01)
(52) U.S. Cl. ........ 375/267; 375/135; 375/136; 375/147; 375/148; 375/224; 375/260; 375/295; 375/316
(58) Field of Classification Search .................. 375/260, 375/267, 295; 370/203, 204, 205, 206, 207, 370/208, 209, 210; 455/132, 134, 135, 136, 455/504, 506, 507
See application file for complete search history.

(56) References Cited

U.S. PATENT DOCUMENTS

| | | | | |
|---|---|---|---|---|
| 5,740,531 A * | 4/1998 | Okada | ............................ | 455/403 |
| 7,310,527 B2 * | 12/2007 | Jagadeesan et al. | .......... | 455/436 |
| 7,313,409 B2 * | 12/2007 | Iacono et al. | ................. | 455/522 |
| 2004/0137863 A1 * | 7/2004 | Walton et al. | ................. | 455/130 |
| 2004/0185782 A1 | 9/2004 | Halford et al. | | |
| 2006/0116092 A1 * | 6/2006 | Uno et al. | ...................... | 455/134 |
| 2006/0270343 A1 * | 11/2006 | Cha et al. | ......................... | 455/25 |

FOREIGN PATENT DOCUMENTS

| | | |
|---|---|---|
| EP | 1 659 813 A1 | 5/2006 |
| EP | 1 912 346 A1 | 4/2008 |
| WO | WO 2004/114457 A2 | 12/2004 |
| WO | WO 2006/110737 A2 | 10/2006 |

OTHER PUBLICATIONS

U.S. Appl. No. 12/323,646, filed Nov. 26, 2008, Wang et al.

\* cited by examiner

*Primary Examiner* — Dhaval Patel
(74) *Attorney, Agent, or Firm* — Oblon, Spivak, McClelland, Maier & Neustadt, L.L.P.

(57) ABSTRACT

A method for transmitting signals in a wireless communication system including the steps of (a) transmitting and receiving the signals subsequently via transmission paths thereby allowing an estimation of channel quality of each transmission path, (b) selecting on a basis of the estimated channel quality several transmission paths as candidates for a communication channel, (c) repeating step (a) at least once under different transmission and/or reception conditions for the several transmission paths selected in step (b), and (d) selecting on basis of the estimated channel quality a small number of transmission paths out of the several transmission paths as candidates for a communication channel.

17 Claims, 4 Drawing Sheets

- Prior Art -

METHOD FOR TRANSMITTING SIGNALS IN A WIRELESS COMMUNICATION SYSTEM AND COMMUNICATION SYSTEM

BACKGROUND

The present invention relates to a method for transmitting signals in a wireless communication system and to a wireless communication system enabling an improved beam steering algorithm for non-line of sight (NLOS) wireless systems.

Wireless communication is used in a large variety of technical fields, such as mobile telephone, wireless LAN, walkie-talkies, broadcast radio systems, point-to-point radio systems and many other known and future applications. The communication radius covered by a respective wireless communication system basically depends on the technique used. Whereas cellular communication systems, such as the GSM and the UMTS system, are adapted for a communication radius up to about 10 km (or more), wireless LAN is in the range of about 100 m (or more) and the Bluetooth system is in the range of several 10 m (or more). The major influences on the communication range of a wireless communication system are the radio frequency and output power used. Although only little absorption of electromagnetic waves in the atmosphere occurs at the radio frequency used for GSM and UMTS, a significant absorption occurs in the 60 GHz range, which makes it quite well suited for low range and indoor wireless communication. Furthermore, the kind of transmission and/or reception antennas used for respective wireless communication technique varies depending on a respective field of application. E.g., if a number of receivers has to be reached or if the location of the receivers is unknown or varies frequently, e.g. due to movement, wide beam antennas or omni-directional antennas are sometimes used. However, the utilisation of wide beam antennas in high data rate mm waves wireless communication systems is problematic, because of the multi-path fading effect.

As shown in FIG. 3 according to prior art, when wide beam antennas 24, 25 are used for both transmitter and receiver sides and the line of sight link $P_0$ is blocked by an obstacle 22, there exist a lot of reflections paths $P_1$, $P_2$ between the transmitter 20 and the receiver 21, i.e. transmission paths in which the transmitted electromagnetic wave is reflected at least once by objects 23a, 23b, 23c, 23d before it reaches the receiver. The channel delay spread might be over tens of symbol periods when the data rate is high, e.g. over 1 Gbps, which leads to severe inter-symbol interference due to deep frequency selective fading.

Two conventional solutions exist for such kind of non line of sight (NLOS) user scenarios, where both of the solutions need high-speed and complex signal processing circuits. One solution adopts a channel equaliser including linear, decision feedback or maximum likelihood sequence estimation (MLSE) equaliser. When the channel delay spread is much longer than the symbol duration, the equaliser becomes complex and needs a lot of processing power. Another solution is the Orthogonal Frequency Division Multiplexing (OFDM) technique, which is already adopted in wireless LAN systems. However, due to its inherent linear modulation and high peak to average ratio problems, the power consumption of the power amplifier (PA) in such systems is very high. Obviously, a high speed fast Fourier transformation (FFT) and other signal processing modules are required for demodulating a 1 Gbps signal. Therefore, it is important to find other solutions which do not require complex and high speed baseband circuitry for high data rate millimeter wave range communication systems.

Document EP 1 659 813 A1 proposes to use a pair of sharp beam steering antennas on the transmitter and on the receiver side. The narrow beam antennas are able to be steered into different positions and thereby the transmitter and the receiver are adapted to establish a first communication path for wireless communication via those narrow beam antennas. Further, document EP 1 659 813 A1 proposes that the transmitter and the receiver are adapted to automatically establish at least one alternative communication path for wireless communication via said first and second narrow beam antennas, such alternative communication path being spatially different from said first communication path.

The disadvantage with the beam steering algorithm of the state of art is that in order to find the optimum steering position and thereby the optimum transmission path, it is necessary to estimate the channel quality of each possible transmission path. This is e.g. achieved by measuring bit error rate (BER) performance. In order to achieve a reliable estimation of the channel quality elaborated, complex channel quality measurements are necessary. On the other hand, if the complexity of the channel quality measurement is reduced, the risk of false estimations of channel quality increases.

SUMMARY

It is therefore the object of the present invention to overcome the above-mentioned drawbacks of the cited prior art.

These objects are achieved by a method for transmitting signals in a wireless communication system and a communication system as further described below.

The present invention relates to a method for transmitting signals in a wireless communication system, in which signals are transmitted from a transmitting device to a receiving device, at least one of said devices having a narrow beam antenna which is adapted to be steered to different positions, each of said different positions corresponding to a number of different transmission paths from said transmitting device to said receiving device, said signals comprising a beam steering frame enabling the estimation of a channel quality of the current transmission path, comprising the steps of a) transmitting and receiving said signals subsequently via each of the plurality of transmission paths thereby allowing an estimation of channel quality of each of the plurality of transmission paths, b) selecting on basis of the estimated channel quality several transmission paths out of the plurality of transmission paths as candidates for a communication channel, c) repeating step a) at least once under different transmission and/or reception conditions for said several transmission paths selected in step b) and d) selecting on basis of the estimated channel quality a small number of transmission paths out of the several transmission paths as candidates for a communication channel.

The present invention further relates to a communication system, in which signals are transmitted from a transmitting device to a receiving device, at least one of said devices having a narrow beam antenna which is adapted to be steered to different positions, each of said different positions corresponding to a number of different transmission paths from said transmitting device to said receiving device, said signals comprising a beam steering frame enabling the estimation of a channel quality of the current transmission path, said transmitting device comprising a beam steering frame generating means (9) adapted to generate the beam steering frame and a first control means adapted to control the transmission of said signals via each of the plurality of transmission paths, said receiving device comprising a channel estimation means adapted to estimate the channel quality of each transmission path on the basis of the received beam steering frame and a second control means adapted to select on basis of the estimated channel quality several transmission paths out of the plurality of transmission paths as candidates for a communication channel and further adapted to transfer the information of the selected several transmission paths to the transmitting device, the first control means further being adapted to control the repetition of the transmission of the signals comprising the beam steering frame at least once under different transmission conditions via each of said several selected transmission paths and said second control means being adapted to select on basis of the estimated channel quality a small number of transmission paths out of the several transmission paths as candidates for a communication channel.

By repeating the transmission of the beam steering frame under different transmission and/or reception conditions only for the already selected transmission paths, the really good and reliable transmission paths can be selected as candidates for a communication channel with a low effort is possible. Further, the repetition of the transmission and estimation provides a control function for the already selected transmission paths.

Preferably, the transmission and/or reception conditions are kept constant during communication.

All transmission paths having a predefined minimum channel quality may be selected.

A predefined number of transmission paths may be selected.

The channel quality may be estimated on basis of the bit error rate, BER, calculation of a pseudo-noise, PN, sequence.

The channel quality may be estimated on basis of a frame error rate, FER, calculation.

The channel quality may be estimated on basis of the bit error rate, BER, calculation of a pseudo-noise, PN, sequence and on basis of a frame error rate, FER, calculation.

Preferably, a cyclic redundancy check, CRC, after receiving the transmission signals is provided for, FER, estimation.

The transmission condition can be changed by reducing the transmission power.

The reception condition can be changed by reducing the receiver sensitivity.

Advantageously, the communication system is a multiple carrier based system, preferably an orthogonal frequency division multiplex, OFDM, system.

It is to be noted that the present invention can be applied to any kind of wireless communication system which enables the transmission and reception of signals over any kind of range. Further, the present invention is not restricted to any kind of modulation schemes or technical implementation of the wireless communication. Some embodiments and implementations of the present invention, however, might be advantageous in short and/or mid-range wireless communication systems in which signals are transmitted in the millimeter wave range, as e.g. the 60 GHz transmission range. Further, the transmitting device and the receiving device of the present invention can be any kind of device adapted to transmit and receive, respectively, signals in a wireless communication system. The terms "transmitting device" and "receiving device" are hereby intended to comprise any kind of portable and/or stationary communication equipment, unit, means, system and so forth. The signals to be transmitted from the transmitting device to the receiving device according to the present invention may comprise any kind of information, data, symbols and so forth which can be transmitted from a transmitter to a receiver for any kind of reason and utility. According to the present invention, at least one of the transmitting device and the receiving device comprises a narrow beam antenna which is adapted to be steered to different positions. In some implementations it might be preferable that the transmitting device and the receiving device each comprise a narrow beam antenna which is adapted to be steered to different positions. The term "narrow beam antenna" is hereby intended to comprise and cover all kinds of antennas which, in contrary to omni-directional antennas, which do not have a specific transmission and/or reception direction, have a specific transmission and/or reception direction without any limitation of the specific shape of the antenna. Further, the narrow beam antenna of the present invention is not restricted to any specific steering type, i.e. the specific technical implementation which enables the steering or switching of the narrow beam antenna to different transmitting and/or reception position as long as the transmitting and/or receiving direction of the narrow beam antenna can be changed, switched, varied or the like. For example, but not exclusively, a narrow beam antenna according to the present invention may be an antenna with a fixed narrow beam radiation pattern, which can be varied by mechanically or electrically shifting the antenna so that the beam direction is varied. Further, the narrow beam antenna could be an antenna type which can be steered by changing the phase and/or the gain of the antenna so that the beam direction changes. As a further alternative, the narrow beam antenna could consist of an antenna pattern, whereby each of the antenna elements of the antenna pattern has a specific narrow beam antenna direction and the elements can be controlled in a way that the beam direction of the antenna is changed. Many other examples of steerable narrow beam antennas can be made, which are currently known or which may be developed in the future, but which would fall under the scope of the present invention.

BRIEF DESCRIPTION OF THE DRAWINGS

The present invention will be explained in more detail in the following description of preferred embodiments in relation to the enclosed drawings, in which FIG. 1 schematically shows a transmitting device according to the present invention, FIG. 2 schematically shows a receiving device according to the present invention, FIG. 3 schematically shows a variety of transmission paths between wide beam antennas according to the state of art, FIG. 4 schematically shows a variety of transmission paths between a transmitting device and a receiving device according to the present invention.

DETAILED DESCRIPTION

Figure 1:
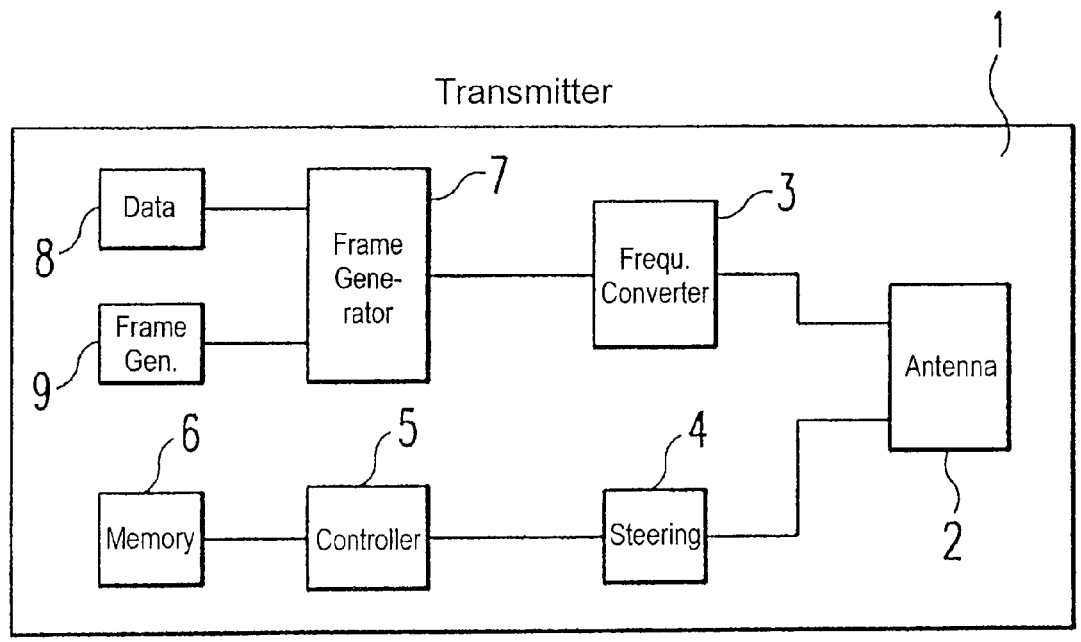

FIG. 1 shows a schematic block diagram of a transmitting device 1 for transmitting signals in a wireless communication system according to the present invention. Hereby, the transmitting device 1 of the present invention as shown in FIG. 1 is only displayed with elements which are necessary for the implementation and the understanding of the present invention. All other necessary elements enabling the transmitting device to transmit signals in a wireless communication system are not shown for the sake of clarity. However, in a practical implementation, all such elements would be implemented.

The transmitting device 1 comprises a first narrow beam antenna 2 which is adapted to be steered into different positions under the control of a first antenna steering means 4, which is controlled by a first control means 5. The control means 5 can be a base band processing and/or controlling means of the transmitting device 1 or any other suitable control unit. The first control means 5 is connected to a first memory 6 for storing date, information, applications, software code and so forth.

The transmitting device 1 is adapted to transmit signals in consecutive time frames, whereby at least some of the frames comprise a beam steering frame. Hereby, it is to be understood that the term "consecutive" does not necessarily mean that the frames are transmitted immediately one after the other. In some implementations there might be an interval between to consecutive frames, which e.g. can be used to handle the clock difference between a transmitting device 1 and a receiving side, such as the receiving device 10 as shown and explained in FIG. 2, in order to support long time and high rate wireless communication, such as high definition television or the like. In the following description and explanations, the interval between two consecutive time frames is assumed to be zero. The beam steering frame section according to the present invention is generated by a beam steering frame generator 9 of the transmitting device 1, whereby the beam steering frame generation can either take place in the frequency domain or the time domain processing. Further, the beam steering frame generated by the beam steering frame generator 9 can have different lengths and sizes depending on the wanted implementation. The frames are formed by a frame generator 7 which obtains the beam steering frame from the beam steering frame generator 9 and the data from the data means 8. The data means 8 generates, collects or obtains the data in any kind of suitable way and forwards the data to the frame generator 7. After a frame has been generated by the frame generator 7, the generated frames are then further processed in the usual manner, e.g. by modulating the frame information or the like, which are then upconverted and transmitted via a high frequency means 3 through the first narrow beam antenna 2.

Figure 2:
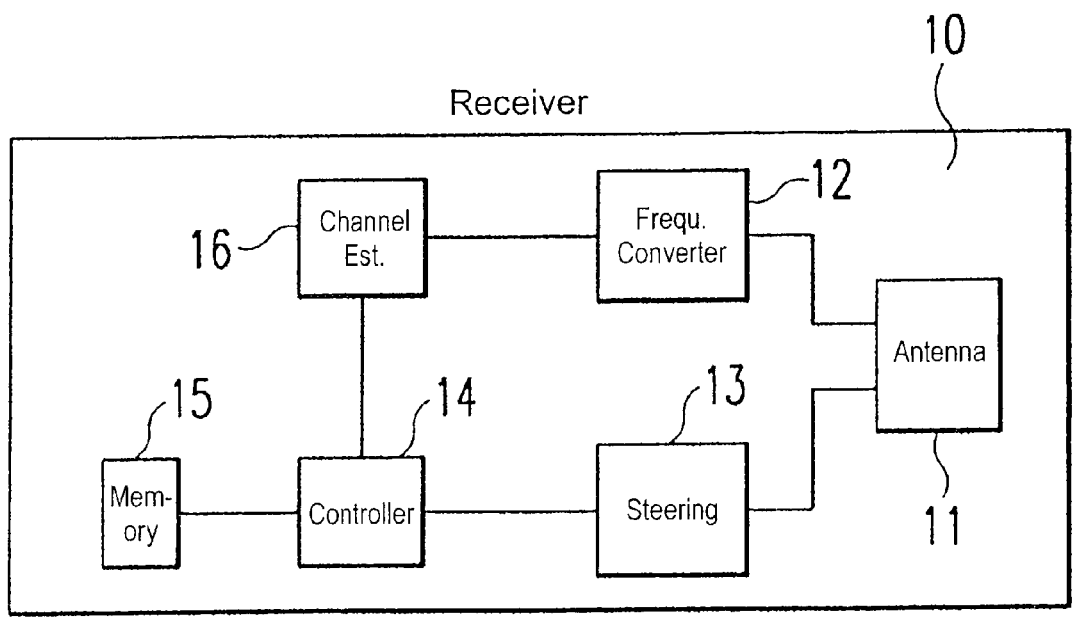

An example of a receiving device 10 for receiving signals in a wireless communication system according to the present invention is schematically shown in the block diagram of FIG. 2. The receiving device 10 comprises a second narrow beam antenna 11 which is adapted to be steered into different positions by a second antenna steering means 13 under the control of the second control means 14. The second control means 14 can be any kind of suitable control means, such as a base band processing means of the receiving device 10, or any other suitable control and/or processing device. The second control means 14 is connected to a second memory 15 adapted to store data, information, applications, software programs and so forth necessary for the operation of the receiving device 10. The receiving device 10 further comprises a high frequency section 12 which is used to downconvert the received signals via the second narrow beam antenna 11, which are then further processed in the usual manner in the receiving device 10. For example, a channel estimator 16 is adapted to perform a channel estimation on the basis of the received beam steering frame. The channel estimation information derived by the channel estimator 16 can be used in the second control means 14 for steering the second narrow beam antenna 11 to a suitable position via the second antenna steering means 13.

The detailed process including the channel estimation and further processing will be explained in the following. It is to be noted that FIG. 2 only shows the necessary elements for understanding the present invention. In a practical implementation the receiving device 10 would comprise all other necessary elements for the operation of the receiving device 10 enabling the reception of signals in a wireless communication system. Further, it is to be noted that the receiving device 10 can additionally comprise all necessary elements and functionalities to transmit signals in a wireless communication system either via the second narrow beam antenna 11 or a separate transmission antenna. Likewise, the transmitting device 1 could comprise all necessary elements and functionalities enabling the reception of signals in a wireless communication system either via the first narrow beam antenna 2 or a separate reception antenna. Further, the elements and functionalities of the transmitting device 1 shown and explained in relation to FIG. 1 and of the receiving device 10 shown and explained in relation to FIG. 2 could be combined in a communication device enabling the transmission and reception of signals in the wireless communication system.

Figure 3:
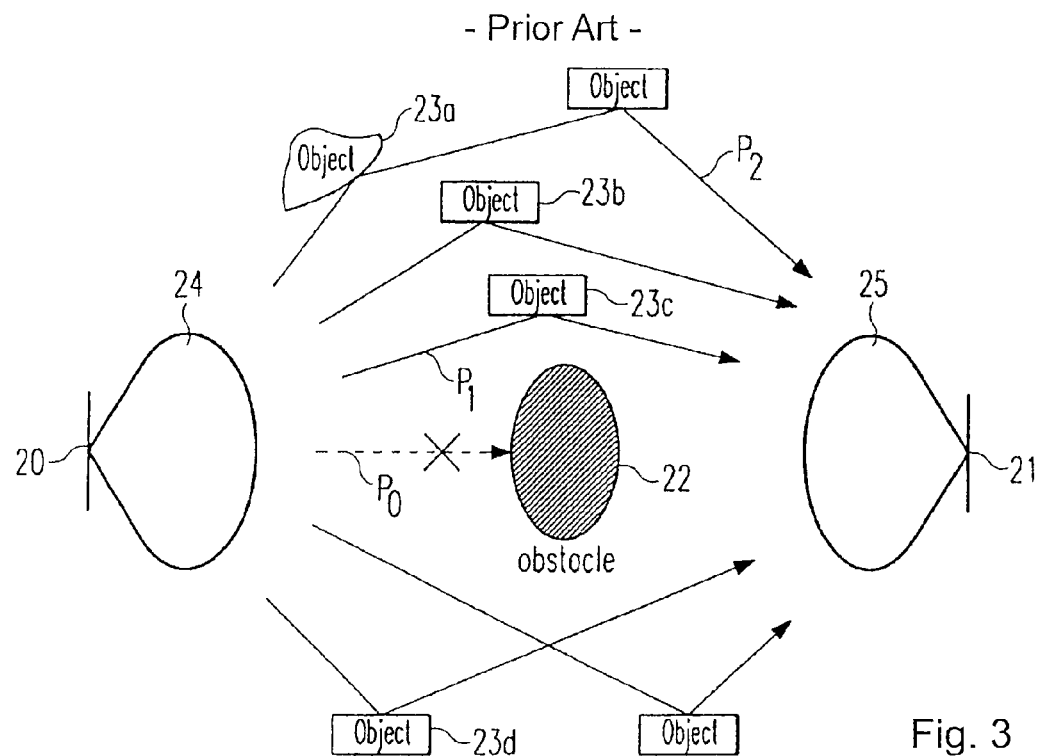

FIG. 3 shows a communication system according to the prior art. If wide beam antennas 24, 25, with e.g. a half power beam width (HPBW) of 100° are used for both a transmitter 20 at a sending site and a receiver 21 at a receiving site and a line of sight (LOS) communication path $P_0$ is blocked by an obstacle 22, there exist a lot of reflection paths $P_1$, $P_2$ between the transmitter 20 and the receiver 21, due to a plurality of reflecting surfaces of several objects 23a, 23b, 23c, 23d. Hereby, the channel delay spread might be over tens of symbol periods when the data transmission rate is high (e.g. over 1 Gbps), which leads to severe inter-symbol interference (ISI) due to deep frequency selective fading.

Figure 4:
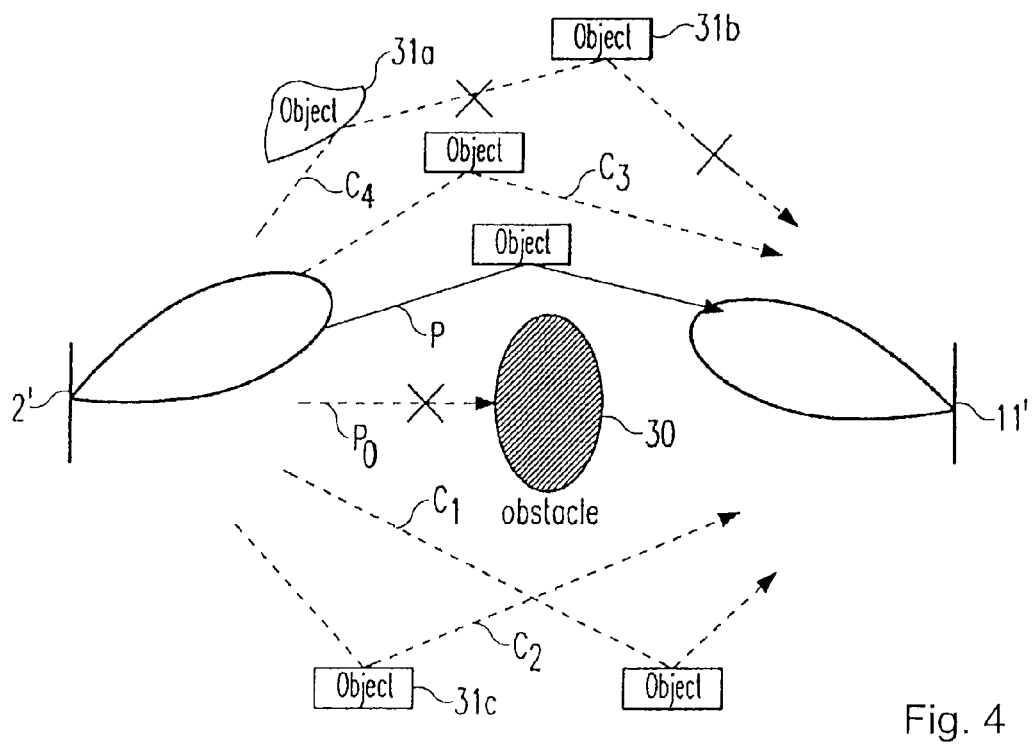

According to the present invention it is therefore proposed to use a pair of narrow beam antennas as shown in FIG. 4. FIG. 4 shows a schematic diagram of various transmission paths between a narrow beam steerable antenna 2' of a transmitting device and a narrow beam steerable antenna 11' of a receiving device. The transmitting narrow beam antenna 2' might be the antenna 2 of the transmitting device 1 shown in FIG. 1 and the receiving narrow beam antenna 11' might be the antenna 11 of the receiving device 10 of FIG. 2. However, it is to be understood that the present invention could also function if only the transmitting device or the receiving device has a steerable narrow beam antenna and the other device only has a wide beam or omni-directional antenna. As shown in FIG. 4, a current transmission path P is not a direct line of sight transmission path, but is a transmission path in which the electro-magnetic signals are reflected once by an object. The direct line of sight transmission path $P_0$ between the steerable antenna 2' and steerable antenna 11' is blocked by an obstacle 30. Candidate transmission paths, i.e. alternative possible transmission paths between the antenna steerable 2' and the steerable antenna 11' are shown as transmission paths $C_1$, $C_2$ and $C_3$ and $C_4$. The candidate transmission paths $C_1$, $C_2$ and $C_3$ are transmission paths in which the electromagnetic signals are reflected once by an object. The candidate transmission path $C_4$ is a candidate transmission path in which the electro-magnetic signals are reflected twice on objects. However, all reflections of the candidate transmission paths are in a way that the reflected electromagnetic signal reaches the receiving antenna 11'. However, in the example shown in FIG. 3, the currently used transmission path P has the best channel properties, e.g. the strongest signal to noise ratio or any other suitable parameter, and is therefore currently used for transmitting signals between the transmitter and the receiver. The candidate transmission paths $C_1$, $C_2$, $C_3$ and $C_4$ are shown with broken lines indicating that the channel qualities of these candidate transmission paths are not as good as the one of the currently used transmission path P. However, in case that the channel qualities of the currently used transmission path P changes, e.g. the reflection object moves or if the transmission path is blocked by another object or obstacle due to movement or the like, one of the candidate transmission paths $C_1$, $C_2$, $C_3$ and $C_4$ might become the current transmission path.

Generally, FIG. 4 also visualises that usually only a quite low number of transmission paths provide a transmission quality which enables the transmission and reception of signals between a transmitter and a receiver. In order to find and monitor all sufficiently strong transmission paths, it is necessary to search and monitor all available and possible transmission paths, whereby the transmitting narrow beam antenna 2' and the receiving narrow beam antenna 11' have a lot of two-dimensional choices. For example, if the scanning range is 100° and the half power beam width (HPBW) of the sharp beam steering antenna is 20°, then the number of choices from each side is 5×5=25 and the total number of choices for both the transmission and the receiving side is 25×25=625. The resulting calculation complexity is very high.

The present invention now suggests a very simple but elegant and effective way to select possible candidate transmission paths in order to be able to switch to a different transmission path as the currently used transmission path deteriorates. Further, the present invention suggests a new channel quality estimation which reduces the overhead for the measurement of the channel quality and enables the implementation of the fast beam steering algorithm.

As already explained at least on the transmitting side or on the receiving side a narrow beam antenna which is steerable into different positions is used. Hereby, every different position corresponds to a different possible transmission path from the transmitting device 1 to the receiving device 10. In an alternative embodiment the transmitting device 1 and/or the receiving device 10 may comprise more narrow beam antennas which all can be steered to different positions. According to an embodiment of the present invention the narrow beam antennas 2, 11 can be steered into 25 different positions. It has to be understood that the present invention is not limited to the number of 25 different positions for each narrow beam antenna, i.e. the antennas may have more or less different positions and the number of positions may be different for the used narrow beam antennas.

Figure 5:
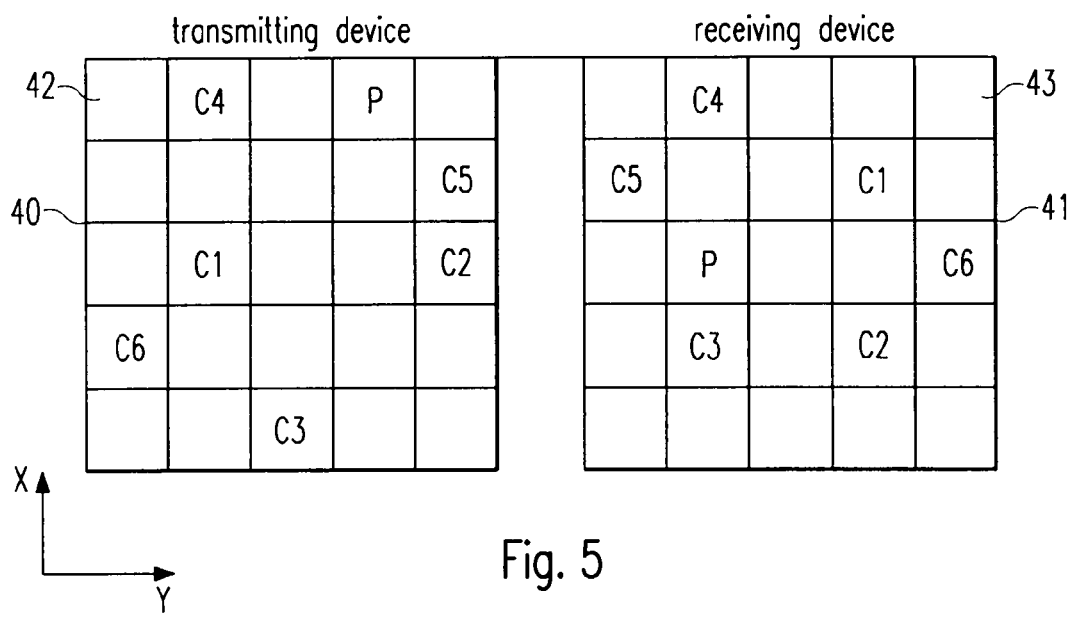
FIG. 5 shows channel quality tables according to a first step of the present invention.

Those different 25 positions for the transmitting device 1 and for the receiving device 10 are schematically shown in the channel quality tables according to FIG. 5. Hereby each of the narrow beam antennas 2, 11 can be steered into five different positions along a first axis, according to FIG. 5 denoted as the x-axis, and can be steered into five different positions along a second axis, according to FIG. 5 denoted as y-axis. Thereby, each antenna can be steered into 5×5=25 different positions in a two-dimensional plane. Hereby, the channel quality of each of the different positions of the beam antenna are measured according to several parameters. When one good transmission path between the transmitting device 1 and the receiving device 10 is found, it is then stored in a channel quality table 40 for the transmitting device 1 and in a channel quality table 41 for the receiving device 10. Each of the squares 42, 43, 52, 53 corresponds to a different positions and thereby to a different transmission path of the narrow beam antenna.

A possibility of channel quality estimation is revealed in document EP 1 659 813 A1, which is incorporated herein by reference. Herefor, the antenna of the transmitting device 1 and of the receiving 10 device are steered into a first positions and then signals are sent from the transmitting device 1 to the receiving device 10. In a next step, the position of the narrow beam antenna of the transmitting device is changed and again signals are sent from the transmitting device to the receiving device. This goes on until the narrow beam antenna of the transmitting device has run through all different positions. The receiving device then depending upon the received signals is able to decide which of the positions of the narrow beam antenna of the transmitting device provides best transmission characteristics. The narrow beam antenna of the transmitting device will then be steered into the position which provided best transmission characteristics and then the same procedure continues for the narrow beam antenna of the receiving device, namely the position of the narrow beam antenna of the receiving device is changed thereby enabling an estimation of the best position of the narrow beam antenna of the receiving device.

It has to be understood, and that is true for all embodiments of the present invention explained herein, that the transmitting device 1 and the receiving device 10 have to have knowledge about the respectively present and next transmission paths corresponding to different steering positions to be used. Further, there is provided some feedback about the transmission channels from the receiving device to the transmitting device and vice versa. Hereby, the corresponding information could e.g. be stored in the second memory means 15 of the receiving device 10 and/or the first memory means 6 of the transmitting device 1.

According to the present invention, for estimating the channel quality the narrow beam antennas 2, 11 of the transmitting device 1 and/or of the receiving device 10 are steered to a first position corresponding to a first transmission path. Then, the beam steering frame generator 9 of the transmitting device 1 will generate a beam steering frame which is sent to the frame generator 7. This frame is then upconverted by the high frequency means 3 and then a signal including the beam steering frame is sent from the transmitting device 1 to the receiving device 10. The channel estimator 16 then depending on the received signal is able to estimate the channel quality of the current transmission path.

The channel quality measurement is according to a first embodiment based on a short pseudo-noise sequence (PN sequence) to reduce the complexity. For a more accurate channel quality estimation a frame error rate (FER) calculation is carried out instead of only auto-correlation of PN sequence, whereby each beam steering frame includes a training sequence for synchronisation and the frame data. In addition, a cyclic redundancy check (CRC) can be used to check if the whole beam steering frame data is received correctly or not. Compared with state of art wireless systems, CRC checking is done before the error control decoder in order to accelerate the speed of beam steering algorithm. In conventional wireless systems, CRC checking for frame error rate calculation is done after error control decoder.

After estimation of channel quality of the first transmission path the narrow beam antennas are subsequently steered to further positions thereby covering every possible transmission path. Depending on the channel quality estimation then a present transmission path having the best channel quality will be selected. This is schematically denoted in the channel quality tables according to FIG. 5 where the square containing the letter P denotes the respective positions of the narrow beam antennas 2, 11 of the transmitting device and of the receiving device 10. Further, several candidate transmission paths C1 to C6 are stored in the channel quality tables 40, 41 in order to have a possibility to change transmission path in case that the present transmission path P is deteriorated.

According to the present invention, it is proposed to use a short PN sequence to reduce the complexity. The problem that arises therewith is that the accuracy of the estimation of channel quality cannot be garantied. For example, if the length of PN sequence is 8192, when there is no bit error, the autocorrelation peak for PN sequence is 8192. On the other hand, when there is one bit error, the autocorrelation peak for the PN sequence is 8192−2=8190. As a result, the peak value of autocorrelation of PN sequence can indicate the bit error rate (BER) performance of the transmission path aligned by the narrow beam antennas 2, 11 of the transmitting device 1 and the receiving device 10. When the length of PN sequence becomes longer, the bit error rate or channel quality estimation becomes more accurate. However, when the length of the PN sequence becomes longer, the corresponding matched filter correlator that is the channel estimator 16 of the receiving device becomes more complex. In practice, the bit error rate of $1 \times 10^3$ before an error control decoder, e. g. a convolutional code, turbo code or LDPC code is required for high data applications, e. g. high definition television (HDTV). Since at least one of the transmitting device 1 and the receiving device 10 adopt a narrow beam antenna, the characteristic of wireless channel can be assumed as quasi AWGN channel and the length of PN sequence shall be longer than $10 \times 10^3 = 10^4$ to get a reliable bit error rate or channel quality estimation. In contrast, due to the hardware complexity configuration, the length of the PN sequence for autocorrelation is normally recommended to be less than 1024. Therefore, an accurate bit error rate or a channel quality estimation normally cannot be obtained for a beam steering algorithm using short PN sequences.

In order to reduce the complexity of the channel quality estimation, a short PN sequence according to the present invention is used instead of a long PN sequence. As already explained, when the PN sequence becomes short, the resolution and accuracy of the channel quality estimation is reduced due to a lack of enough samples. There might be a lot of transmission paths between the transmitting device 1 and the receiving device 10 which based on the PN sequence are indicated to fulfil the requirements for becoming a communication channel, e. g. the autocorrelation of the short PN sequence illustrates no bit error within short correlation length. But some of the selected candidate paths might not be good and reliable enough.

This problem is overcome by the present invention.

The present invention proposes to repeat a channel quality estimation under different transmission and/or reception conditions as will be explained in the following. As already explained after steering the antennas 2, 11 to different positions corresponding to different transmission paths, the channel quality tables 40 and 41 as shown in FIG. 5 are generated. That means, that out of the plurality of all possible transmission paths a present transmission path to be used as communication channel P is selected and further several transmission paths out of the plurality of transmission paths are selected as candidates C1 to C6 for a communication channel. The present invention now proposes to repeat a transmission of signals including a beam steering frame from the transmitting device 1 to the receiving device 10 only for the already selected transmission path C1 to C6. During the second transmission, the transmission and/or reception conditions are changed, namely either the transmission power of the transmitting device 1 is reduced, the receiving sensitivity of the receiving device 10 is reduced or both. When checking the already selected several transmission paths C1 to C6 under different transmissions/receiving conditions with the same short PN sequence for example the channel quality for the channels C2, C4 and C6 might still be good whereby at the same time the channel qualities for the other candidate transmission channels C1, C3 and C5 might be bad. After this second transmission of the signals when it is clear that only the transmission paths C2, C4 and C6 provide optimal transmission characteristics, only these three transmission paths C2, C4 and C6 are adopted as possible candidates for a communication channel and are stored in the channel quality table 50 and 51.

Figure 6:
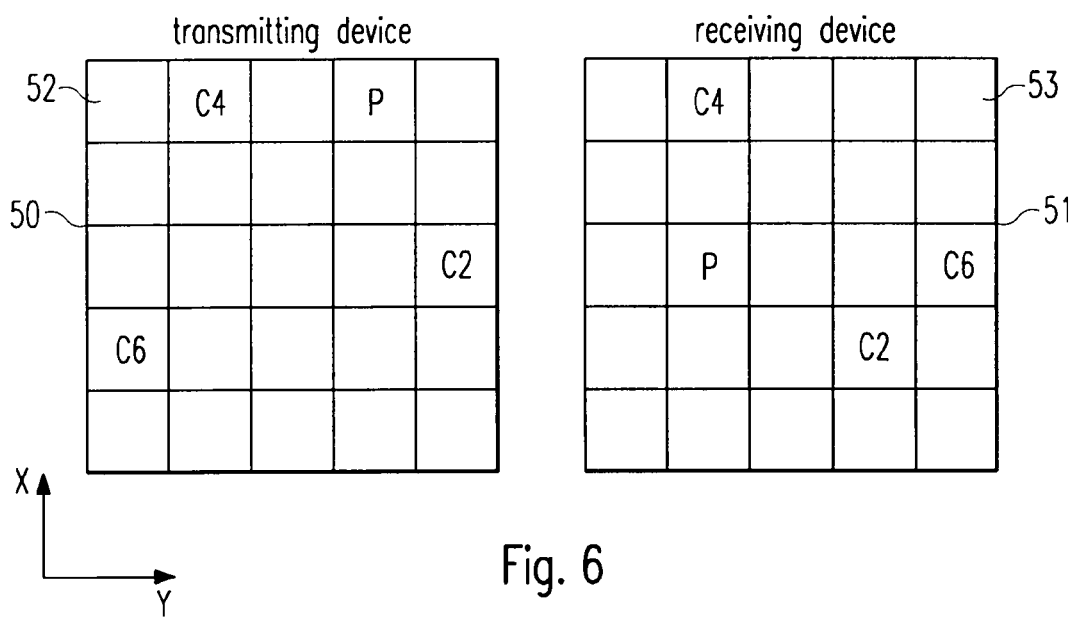
FIG. 6 shows channel quality tables according to a second step of the present invention, and FIG. 7 schematically shows a flow chart according to the method of the present invention.

In summary, first several transmission paths out of the plurality of transmission path are selected and afterwards the transmission and/or receiving conditions are changed in order to check on the already selected several transmission paths if they still fulfil the requirement of channel quality estimation. If only a small number of transmission paths now satisfy the requirement, the channel quality tables 50, 51 are updated as shown in FIG. 6. On the other hand, if all the transmission paths which were selected in the first signal transmission still fulfil the channel quality requirements during the second signal transmission, a further reduction of the transmission power or a change of the receiving sensitivity can be conducted for the beam steering frame transmission until only a small number of transmission paths are selected as candidates for a communication channel.

In case of a change of transmission power, this means that although the transmitted power of data frame is fixed for a data communication, the transmitted power of the beam steering frame can be adjustable to enable the reliability of the beam steering and improve the performance. For a bit error rate measurement, the transmitted power can be reduced for the beam steering frame. Therefore, the bit error rate performance can be degraded intentionally and a short PN sequence can be used to find a smaller number of strong transmission paths, that is there is a clear distinction between real strong paths and relatively strong paths whereby only real strong paths are selected as candidates for a communication channel.

For frame error rate measurement, the frame error rate is calculated before the error control decoder instead of after the error control decoder. Therefore, the frame error rate can be degraded intentionally in order to find a smaller number of strong candidate paths using a short beam steering frame and enable a reliable beam steering.

As already explained in a preferred embodiment, the transmitting power is reduced. A further possibility would be to change the receiver sensitivity instead or in addition of a reduction of transmission power. When the transmission power for short PN sequence is fixed, the signal to noise ratio at the receiver antenna front end is fixed. However, this receiver circuit can be adjusted to change the bit error rate performance of short PN sequence intentionally. The receiver sensitivity can be changed by adjusting the amplifier gain and/or attenuator.

Figure 7:
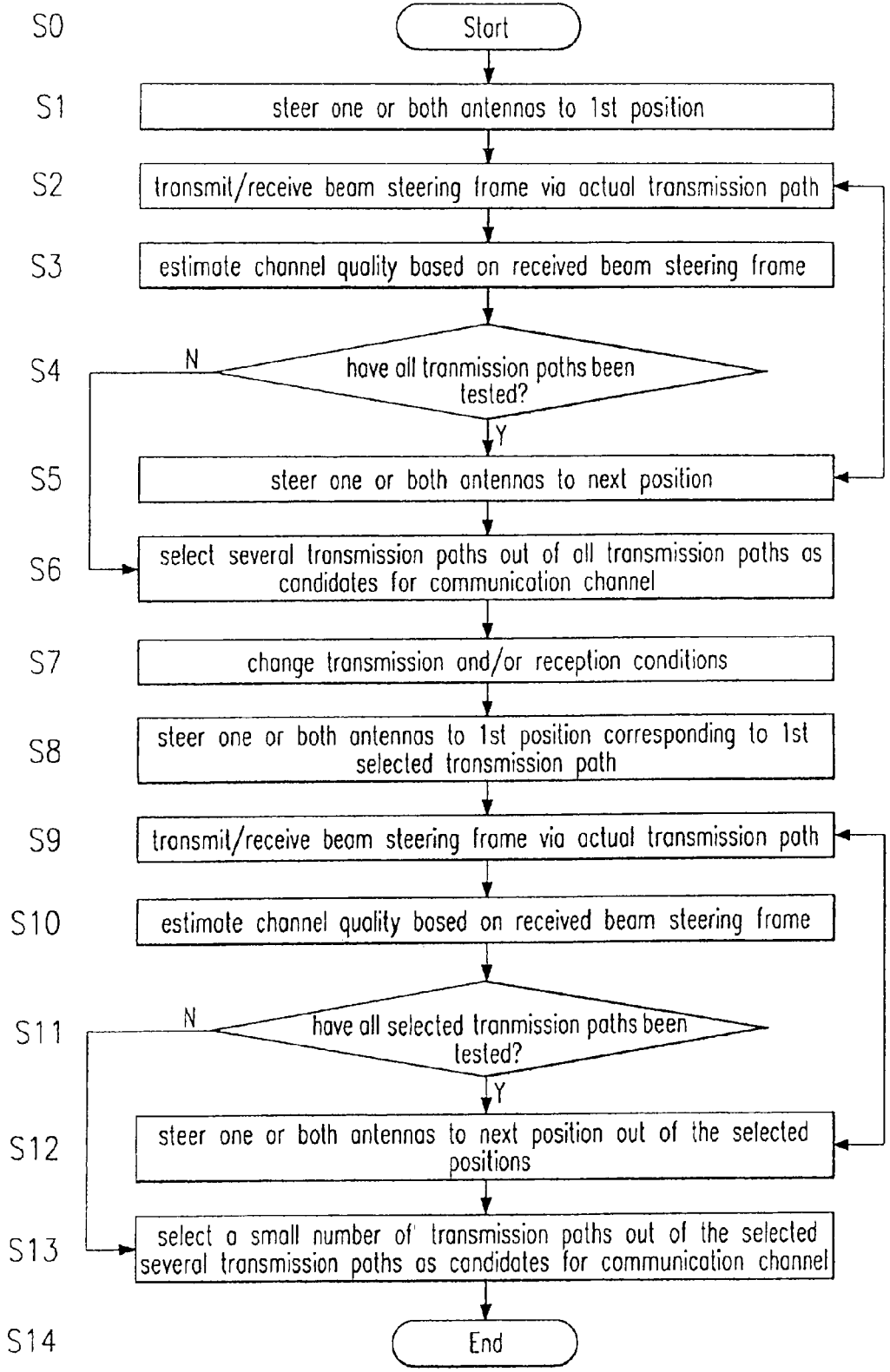

The process according to the present invention will now be explained with reference to the flow chart according to FIG. 7. The process starts in step S0 e. g. with the need of setting up a communication. In step S1, one or both narrow beam antennas 2, 11 are steered to the first position corresponding to the first transmission path. The term "one or both" hereby denotes that the present invention also encloses the possibility that only the transmitting device 1 or only the receiving device 10 comprise a narrow beam antenna. In the next step S2, a signal comprising the beam steering frame is transmitted from the transmitting device 1 to the receiving device 10 and is received by the receiving device 10. In the next steps S3, the channel estimator 16 estimates the channel quality of the present transmission path based on the received beam steering frame.

In the next step S4, it is checked if all possible transmission paths have been tested. Hereby, it is possible to provide that not all of the plurality of transmission paths are checked but only a reduced number of transmission path is tested whether they are a reliable communication channel. If it is decided that not all or a sufficient number of transmission paths have been tested, then in step S5 one or both antennas 2, 11 are steered to the next position corresponding to the next transmission path. The process then goes back to step S2 where the signal containing the beam steering frame is transmitted by the transmitting device to the receiving device 10 via the actual selected transmission path.

Otherwise, if in step S4 it is determined that all or a sufficient number of transmission paths have been tested, then the process continues with step S6 where the second control means 14 of the receiving device selects several transmission paths out of the plurality of tested transmission paths as candidates for a communication channel. The selection is based on the data transmitted from the channel estimation 16. The information of the selected several transmission paths have to be transferred from the receiving device 10 to the transmitting device 1 in order to enable a further testing of the already selected several transmission paths.

In the next step S7, the transmission and/or reception conditions are changed, that is as already explained either the transmission power of the transmitting device 1 is reduced or the receiving sensitivity of the receiving device 10 is changed. In the next step S8, one or both antennas 2, 11 are steered to the first position whereby the first position corresponds to the first selected transmission path, that is to the first transmission path selected in step S6. In the next step S9, the signal comprising the beam steering frame is transmitted from the transmitting device 1 to the receiving device 10 via the actual transmission path. In the next step S10, the channel estimator 16 estimates the channel quality of the present transmission path based on the received beam steering frame.

In the next step S11, it is decided if all selected transmission paths have been tested under changed transmission/reception conditions, that is if all transmission paths selected in step S6 have been tested again. If it is decided that not yet all selected transmission paths have been tested again, then in step S12 one or both antennas are steered to the next position, corresponding to the next transmission path out of the selected transmission paths. The process then continues with step S9 with a transmission of the signal comprising the beam steering frame. Otherwise, if in step S11 it is decided that all selected transmission paths have been tested, then in step S13 the second control means 14 of the receiving device selects a small number of transmission paths out of the selected transmission paths as candidates for a communication channel. The process ends at step S14 with for example a creation of a channel quality table 50, 51 as shown in FIG. 6.

In an alternative embodiment according to the present invention, it is possible to repeat the sending of signals comprising a beam steering frame several times under different transmission/reception condition, that is the present invention is not limited to a single repetition of the signal transmission. Further, the parameters for selecting the possible transmission path may either comprise a threshold indicating the channel quality, that means that every channel which is better than the threshold is adopted as a possible communication channel. Another possibility would be to define the number of communication channels which have to be selected, e. g. to define that only the three best communication channels are selected even if some more transmission paths provide almost the same good transmission characteristics.

With the present invention, a short PN sequence can be adopted to a beam steering algorithm with a low receiver complexity. The number of transmission paths being candidates for a communication channel can be reduced, whereby real strong and reliable paths are selected as candidate transmission path. The overhead for a beam steering can be reduced due to the introduction of short PN sequence. In addition, a reliable beam steering and good performance can be achieved.

The invention claimed is:

1. A method for transmitting signals in a wireless communication system, in which signals are transmitted from a transmitting device to a receiving device, at least one of said devices having an antenna generating an antenna beam at different positions, each of said different positions corresponding to a number of different transmission paths from said transmitting device to said receiving device, said signals including a beam steering frame enabling an estimation of a channel quality of a current transmission path, the method comprising:
   a) transmitting and receiving said signals subsequently via each of the plurality of transmission paths to allow an estimation of channel quality of each of the plurality of transmission paths,
   b) selecting on a basis of the estimated channel quality several transmission paths out of the plurality of transmission paths as candidates for a communication channel,
   c) repeating step a) at least once at least one of reduced transmission power or reduced receiver sensitivity for said several transmission paths selected in step b) and
   d) selecting a small number of transmission paths out of the several transmission paths as candidates for a communication channel on a basis of the channel quality estimated at least one of the reduced transmission power or the reduced receiver sensitivity.

2. The method according to claim 1, wherein the method further comprises:
   keeping at least one of transmission and reception conditions constant during communication.

3. The method according to claim 1, wherein the method further comprises:
   selecting in step b) and/or d) all transmission paths having a predefined minimum channel quality.

4. The method according to claim 1, wherein the method further comprises:
   selecting in step b) and/or d) a predefined number of transmission paths.

5. The method according to claim 1, wherein the method further comprises:
   estimating the channel quality on a basis of the bit error rate, BER, calculation of a pseudo-noise, PN, sequence.

6. The method according to claim 1, wherein the method further comprises:
   estimating the channel quality on a basis of a frame error rate, FER, calculation.

7. The method according to claim 1, wherein the method further comprises:
   estimating the channel quality on a basis of the bit error rate, BER, calculation of a pseudo-noise, PN, sequence and on basis of a frame error rate, FER, calculation.

8. The method according to claim 1, wherein the method further comprises:
   providing a cyclic redundancy check, CRC, after receiving the transmission signals.

9. A communication system, in which signals are transmitted from a transmitting device to a receiving device, at least one of said devices having an antenna generating an antenna beam at different positions, each of said different positions corresponding to a number of different transmission paths from said transmitting device to said receiving device, said signals having a beam steering frame enabling an estimation of a channel quality of a current transmission path, said transmitting device comprising:

a beam steering frame generating means for generating the beam steering frame; and a first control means for controlling the transmission of said signals via each of the plurality of transmission paths, said receiving device comprising, a channel estimation means for estimating the a channel quality of each transmission path on a basis of the received beam steering frame; and a second control means for selecting on a basis of the estimated channel quality several transmission paths out of the plurality of transmission paths as candidates for a communication channel and further adapted to transfer information of the selected several transmission paths to the transmitting device, wherein the first control means is further controlling the repetition of the transmission of the signals comprising the beam steering frame at least once at least one of reduced transmission power and or reduced receiver sensitivity via each of said several selected transmission paths, and said second control means is further selecting a small number of transmission paths out of the several transmission paths as candidates for a communication channel on a basis of a channel quality estimated at least one of the reduced transmission power or the reduced receiver sensitivity.

10. The communication system according to claim 9, wherein the first control means keeps at least one of transmission and reception conditions constant during communication.

11. The communication system according to claim 9, wherein the second control means selects all transmission paths having a predefined minimum channel quality.

12. The communication system according to claim 9, wherein the second control means selects a predefined number of transmission paths.

13. The communication system according to claim 9, wherein the channel estimation means estimates the channel quality on a basis of the bit error rate, BER, calculation of a pseudo-noise, PN, sequence.

14. The communication system according to claim 9, wherein the channel estimation means estimates the channel quality on a basis of a frame error rate, FER, calculation.

15. The communication system according to claim 9, wherein the channel estimation means estimates the channel quality on a basis of the bit error rate, BER, calculation of a pseudo-noise, PN, sequence and on a basis of a frame error rate, FER, calculation.

16. The communication system according to claim 9, wherein the receiving device provides a cyclic redundancy check, CRC, after receiving the transmission signals.

17. The communication system according to claim 9, wherein said communication system is a multiple carrier based system, comprising an orthogonal frequency division multiplex, OFDM, system.

\* \* \* \* \*